United States Patent [19]

Hutchinson

[11] 3,922,228

[45] Nov. 25, 1975

[54] AZEOTROPIC COMPOSITION CONSISTING OF DIFLUOROMETHYL TRIFLUOROMETHYLETHER AND DIMETHYL ETHER

[75] Inventor: William M. Hutchinson, Bartlesville, Okla.

[73] Assignee: Phillips Petroleum Company, Bartlesville, Okla.

[22] Filed: Mar. 22, 1973

[21] Appl. No.: 344,025

[52] U.S. Cl............. 252/67; 252/305; 260/614 F; 62/112; 62/114
[51] Int. Cl.² .......................................... C09K 5/00
[58] Field of Search.............. 252/67, DIG. 9, 305; 260/614 F; 62/112, 114

[56] References Cited
UNITED STATES PATENTS

| 2,066,905 | 1/1937 | Booth | 252/67 |
| 2,101,993 | 12/1937 | Fleischer | 252/DIG. 9 |
| 3,362,180 | 1/1968 | Eiseman | 62/114 |

*Primary Examiner*—Benjamin R. Padgett
*Assistant Examiner*—Josephine Lloyd

[57] ABSTRACT

Azeotropic compositions are formed by difluoromethyl trifluoromethyl ether with dimethyl ether.

6 Claims, No Drawings

AZEOTROPIC COMPOSITION CONSISTING OF DIFLUOROMETHYL TRIFLUOROMETHYLETHER AND DIMETHYL ETHER

FIELD OF THE INVENTION

The invention relates to novel compositions of difluoromethyl trifluoromethyl ether with dimethyl ether.

BACKGROUND OF THE INVENTION

Substantially constant boiling mixtures are liquid mixtures of two or more substances which mixtures tend to behave as though a single substance were involved, and that the vapor produced by partial evaporation or distillation of the constant boiling admixture has the same composition as does the liquid. Constant boiling admixtures are termed "azeotropes", the azeotropic compositions exhibiting either a maximum or minimum boiling point as compared with the boiling point of other but nonazeotropic mixtures of the same two or more substances.

OBJECTS OF THE INVENTION

It is an object of this invention to provide novel substantially constant boiling compositions.

Other aspects, objects, and several advantages of my invention will be readily apparent to one skilled in the art to which the invention most nearly pertains from the reading of my description and the consideration of my appended claims.

SUMMARY OF THE INVENTION

I have discovered that difluoromethyl trifluoromethyl ether forms with dimethyl ether substantially constant boiling admixtures, and, indeed, at least two disparate azeotropes.

An azeotrope may be defined as a constant-boiling admixture which distills without changing composition. Yet, at a differing pressure, the composition indeed may vary, at least slightly, with change in distillation pressure, which also changes, at least slightly, the distillation temperature. Thus, an azeotrope of A and B may represent a unique type of relationship with a variable composition.

It should be possible to fingerprint an azeotropic constant-boiling admixture, which may appear under varying guises depending upon the conditions chosen, by any of several criteria: the composition may be defined as an azeotrope of A and B, since the very term "azeotrope" is at once definitive and limitative, requiring that A and B indeed form this unique composition of matter which is a constant-boiling admixture. Or, the composition may be defined as a particular weight per cent relationship or mole per cent relationship of A:B, but recognizing that such values point out only one such relationship, whereas a series of relationships A:B actually may exist for a given azeotrope, varied by influence of temperature and pressure. Or, recognizing that, broadly speaking, an azeotrope of A:B represents a series of such relationships, the azeotropic series represented by A:B may, in effect, be fingerprinted or characterized by defining the composition as an azeotrope further characterized by particular boiling point at a given pressure, thus giving identifying characteristics without unduly limiting the scope of the invention discovered and endeavored to be claimed.

The substantially constant-boiling admixtures that I have discovered contain difluoromethyl trifluoromethyl ether and dimethyl ether. One substantially constant-boiling admixture of these two components is characterized by a boiling point of about −22°C. at about 741 millimeters mercury pressure, and analysis of this composition indicated a major proportion or about 65.4 weight per cent difluoromethyl trifluoromethyl ether and a minor proportion or about 34.6 weight per cent dimethyl ether. Another azeotrope that I have discovered is characterized by a boiling point of about −23.4°C. at about 742 millimeters mercury pressure, and analysis of this azeotropic composition indicated a minor proportion of about 17.4 weight per cent difluoromethyl trifluoromethyl ether and a major proportion or about 82.6 weight percent dimethyl ether. Of course, it would be improper to strictly define these azeotropes as being such exacting compositions for the reasons as discussed above, and also due to possible slight variations in monitoring analytical equipment results. The azeotropes can be defined by the boiling point/pressure relationships.

EXAMPLES

The following data are presented to illustrate my invention and to show the determination of the azeotropic admixtures I have discovered.

The azeotropic compositions were obtained by distilling a mixture of difluoromethyl trifluoromethyl ether and dimethyl ether and obtaining a constant-boiling, constant-composition mixture. The distillation unit comprised an Ace Glass Company No. 9219 concentric tube fractionating column about 13 inches long, about 10 mm internal diameter; silvered vacuum jacket; rated 40 theoretical plates at 80 cc/hr. boil up rate, a vacuum jacketed head with magnetic take-off fitted with a copper-constantan thermocouple and Thermoelectric Minimite potentiometer giving temperature readings within 0.2° C. accuracy; a graduated receiver, and a 25 cc conical kettle heated by a mantle and wrapped in glass wool. The condenser was cold-finger type cooled by dry ice and trichlorofluoromethane. The receiver was cooled to prevent reboiling. The pressure was atmospheric, and the pressure was measured frequently with a calibrated aneroid barometer graduated in mm Hg. The overhead products (both liquid phases when two appeared) or the kettle product of Example II were analyzed with an Aerograph 1520 gas chromatograph having a disc integrator on its recorder.

EXAMPLE I

Run 1: A mixture of 10.4 weight per cent difluoromethyl trifluoromethyl ether and 89.6 weight per cent dimethyl ether was charged to the kettle and heated to its atmospheric boiling point and distilled at a high reflux ratio of at least 5:1 and up to 40:1. A maximum boiling azeotrope was obtained as the constant-boiling, constant-composition mixture consisting essentially of 17.7 weight per cent difluoromethyl trifluoromethyl ether and 82.3 weight per cent dimethyl ether at 742,8 mm Hg pressure, boiling point −23.4°C.

Run 2: To approach this azeotrope from the other side, a mixture of 26.2 weight per cent difluoromethyl trifluoromethyl ether and 73.8 weight per cent dimethyl ether was charged to the kettle and heated to its atmospheric boiling point and distilled at a 20:1 reflux ratio. A maximum boiling azeotrope was obtained as the constant-boiling, constant-composition mixture consisting essentially of 17.2 weight per cent difluoromethyl trifluoromethyl ether and 82.8 weight per cent dimethyl ether at 742 mm Hg pressure. The azeotropic boiling point was −23.4°C.

The existence of an azeotrope thus was established by two approaches. The feed composition of Run 1, 10.4 weight per cent difluoromethyl trifluoromethyl ether upon distillation became enriched in this component until reaching a concentration of 17.7 weight per cent at which concentration it distilled completely without change in composition. In Run 2, the feed composition of 26.2 weight per cent difluoromethyl trifluoromethyl ether became depleted in this component upon distillation until reaching approximately the same concentration of 17.2 weight per cent as in Run 1.

EXAMPLE II

Run 3: A mixture of 80.8 weight per cent difluoromethyl trifluoromethyl ether and 19.2 weight per cent dimethyl ether was charged to the kettle and heated to its atmospheric boiling point and distilled at a 10:1 reflux ratio. A maximum boiling azeotrope was obtained in the kettle consisting essentially of 65.7 weight per cent difluoromethyl trifluoromethyl ether and 34.3 weight per cent dimethyl ether at 741.4 mm Hg pressure, boiling point −22.0°C.

Run 4: To approach the azeotrope from the other side a mixture of 62.0 weight per cent difluoromethyl trifluoromethyl ether and 38.0 weight per cent dimethyl ether was charged to the kettle and heated to its atmospheric boiling point and distilled at a 20:1 reflux ratio. A maximum boiling azeotrope was obtained as the constant-boiling constant-composition mixture consisting essentially of 65.2 weight per cent difluoromethyl trifluoromethyl ether and 34.8 weight per cent dimethyl ether at 740.8 mm Hg pressure, boiling point −22.0°C.

TABLE I

Summary of Binary Maximum Boiling Azeotropes

| Example | $CHF_2OCF_3$ Wt. % | $CH_3OCH_3$ Wt. % | B.P., °C. | Pressure mm. Hg |
|---|---|---|---|---|
| I-Run 1 | 17.7 | 82.3 | −23.4 | 742.8 |
| Run 2 | 17.2 | 82.8 | −23.4 | 742.0 |
| Average | 17.4 | 82.6 | −23.4 | 742.4 |
| II-Run 1 | 65.7 | 34.3 | −22.0 | 741.4 |
| Run 2 | 65.2 | 34.8 | −22.0 | 740.8 |
| Average | 65.4 | 34.6 | −22.0 | 741.1 |

The above Table shows a summary of the runs of the several examples to illustrate the azeotropes I have discovered. Each of the two azeotropes was demonstrated by approaching the azeotropic boiling point by compositions starting on each side.

The azeotrope containing the major amount of difluoromethyl trifluoromethyl ether and minor amount of dimethyl ether is useful as a refrigerant in particular. The azeotrope containing the minor amount of difluoromethyl trifluoromethyl ether and major amount of dimethyl ether is particularly useful as a degreasing solvent, such as degreasing of wool. The azeotropes have other specialty applications such as specialty refrigeration, vapor phase degreasing, flux solvents, aerosol propellants, cleaning solvents for various purposes such as garments and the like, and a variety of other uses.

From the preceding descriptions, it will be apparent that my invention provides novel substantially constant-boiling and azeotropic compositions useful for a wide variety of purposes.

Certainly, reasonable variations and modifications of my invention are possible yet still within the scope of my disclosure and without departing from the intended scope and spirit thereof.

I claim:

1. a substantially constant boiling admixture of a major proportion of difluoromethyl trifluoromethyl ether and a minor amount of dimethyl ether wherein said admixture is characterized as an azeotrope.

2. The composition according to claim 1 wherein said difluoromethyl trifluoromethyl ether represents about 65.4 weight per cent and said dimethyl ether about 34.6 weight per cent of said composition.

3. The composition according to claim 1 characterized by a boiling point of about −22° C. at about 741 millimeters mercury.

4. A substantially constant boiling admixture of a minor amount of difluoromethyl trifluoromethyl ether and a major proportion of dimethyl ether wherein said admixture is characterized as an azeotrope.

5. The composition according to claim 4 wherein said difluoromethyl trifluoromethyl ether represents about 17.4 weight per cent and said dimethyl ether represents about 82.6 weight per cent of the total weight of said composition.

6. The composition according to claim 4 further characterized by a boiling point of about −23.4° C. at about 742 millimeters mercury.

\* \* \* \* \*